Patented Feb. 2, 1954

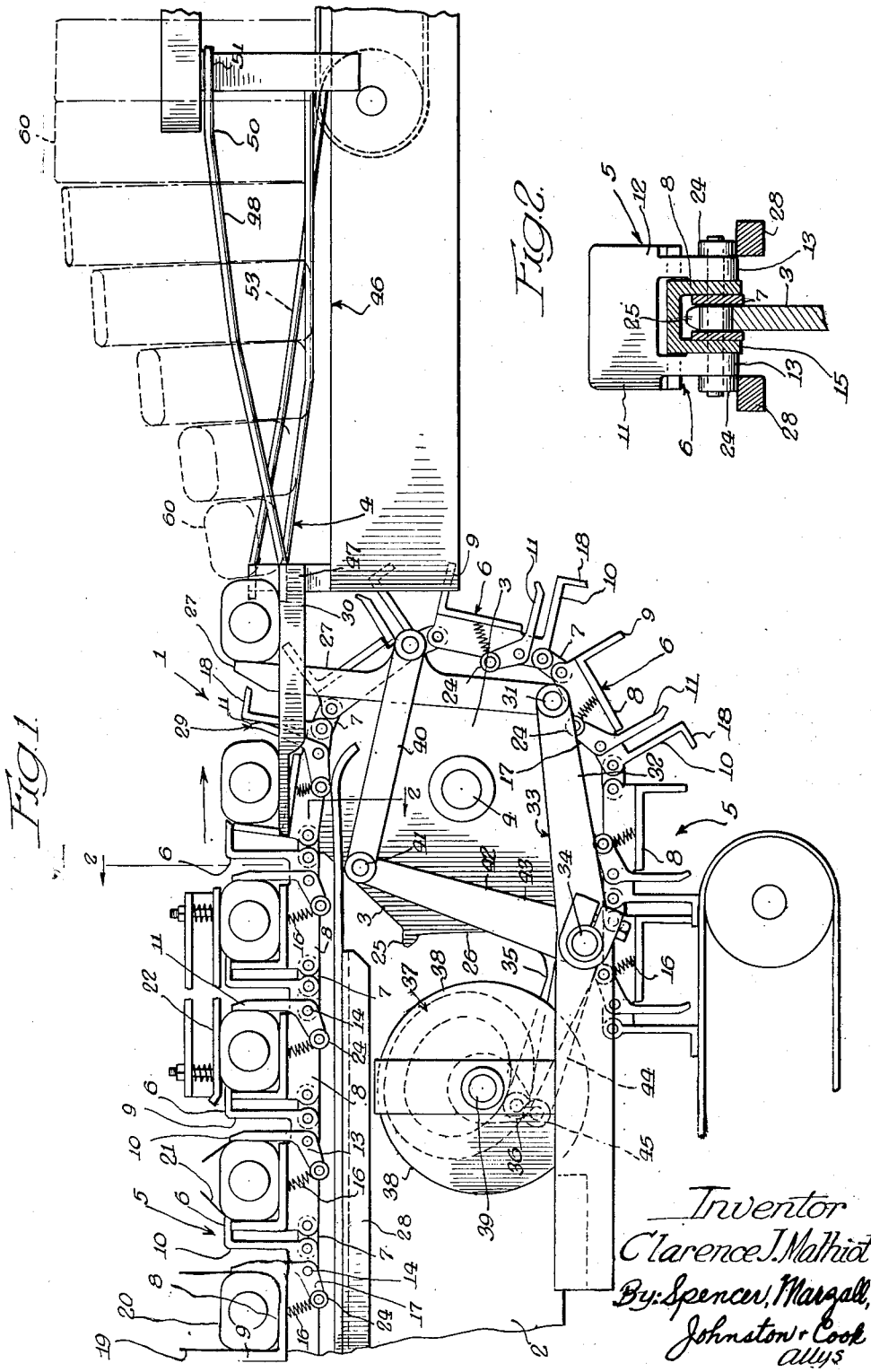
Feb. 2, 1954 — C. J. MALHIOT — 2,667,958
CONVEYING AND TRANSFERRING MECHANISM
Filed Feb. 26, 1948 — 3 Sheets-Sheet 1
Inventor
Clarence J. Malhiot
By: Spencer, Margall, Johnston & Cook
attys

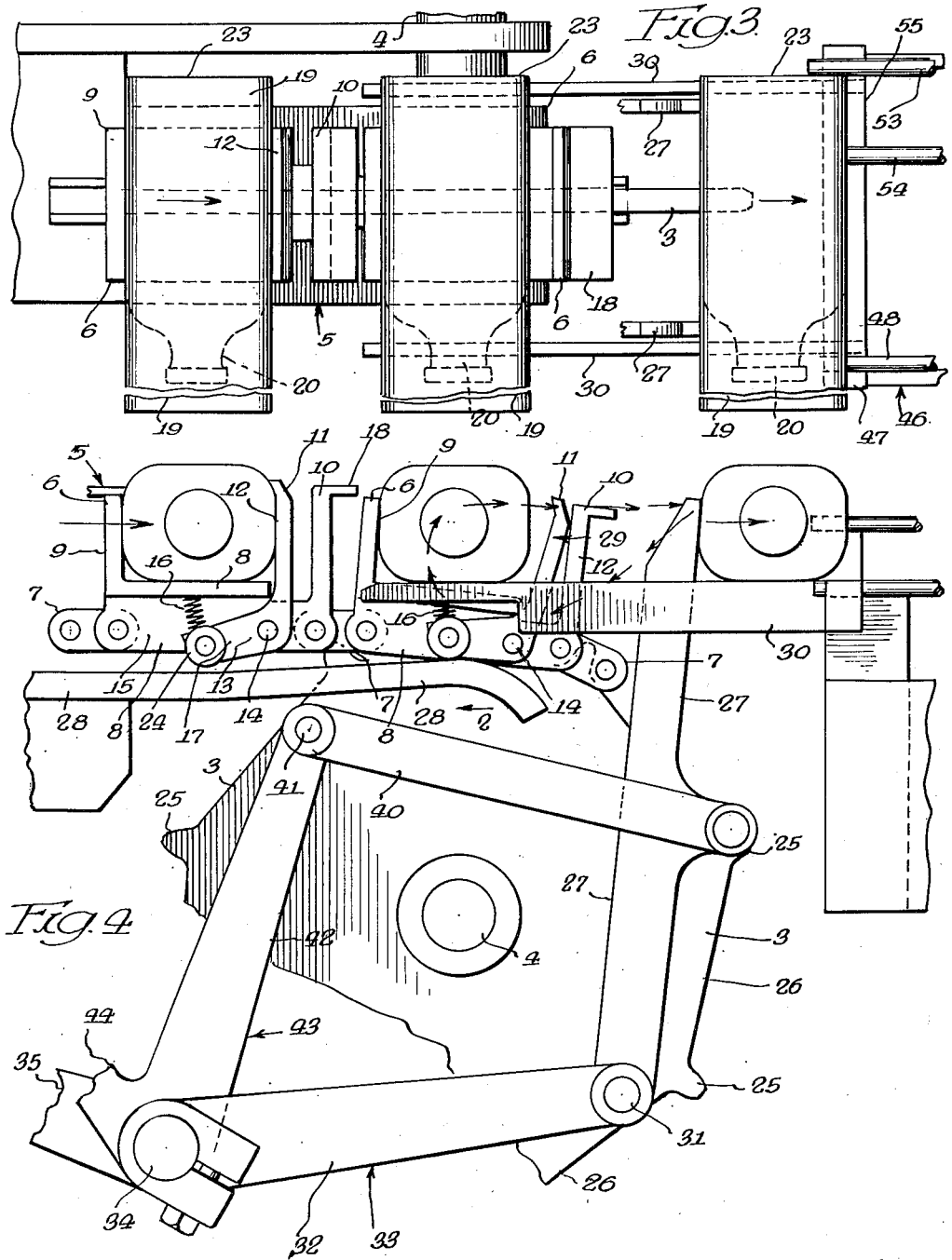

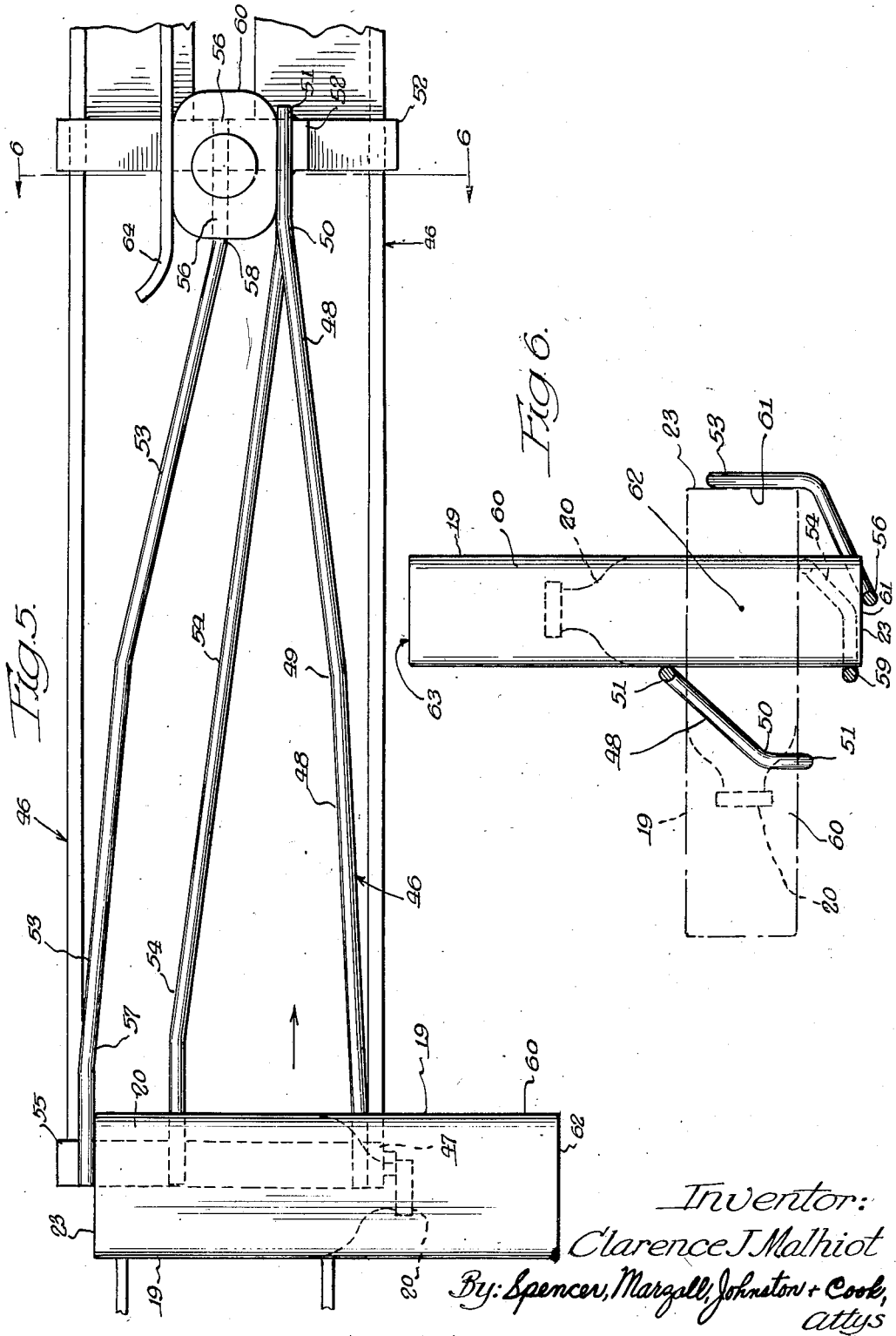

2,667,958

UNITED STATES PATENT OFFICE 2,667,958

CONVEYING AND TRANSFERRING MECHANISM

Clarence J. Malhiot, Oak Park, Ill., assignor to F. B. Redington Co., Chicago, Ill., a corporation of Delaware Application February 26, 1948, Serial No. 10,962

10 Claims. (Cl. 198—24)

1

This invention relates in general to conveying and transferring mechanism for conveying and transporting an article from one position to another, and particularly, to means for conveying and transferring an article from one position to another to effect packaging or wrapping of the article while being so transmitted and conveyed. More specifically the invention relates to conveying and transferring mechanism as applied to wrapping machines whereby the article is wrapped during the conveying and transferring operations and finally delivered to discharge position after certain stages of the wrapping operation.

The primary object of the present invention is to provide new and novel mechanism for conveying and transferring an article during certain wrapping stages and while the article is in a predetermined position, and then later shifting the position of the article after predetermined steps of the wrapping have been completed so as to facilitate further wrapping or handling at a predetermined discharge position.

Another object of the invention is the provision of new and improved conveying and transferring mechanism whereby a wrapper and an article are positioned in an article receiving part or bucket of a conveying and transferring mechanism where certain wrapping operations are performed, the completely or partly wrapped article being delivered to discharge position from the said mechanism in a straight line and at the same plane.

Another important object of the invention is the provision of simple, positive, effective and economical means for effecting and maintaining the positioning of an article during various stages of wrapping operations and during the discharge position of the completely or partly wrapped article, the article being completely or partially wrapped while in a certain position in a bucket preferably on its side, and later shifted to be stood up on end to effect further wrapping operations, or for any other purpose of convenience.

A still further object of the invention is to provide improved transferring and conveying mechanism including spaced buckets, each bucket having rigid end walls with a shiftable wall arranged between said end walls, whereby the article will be held securely between one rigid wall and the shiftable wall during various wrapping operations, the shiftable wall being shifted to permit entrance of the article and a wrapper between a rigid wall and a shiftable wall and then released to hold the article and its wrapper

2 in the bucket, and then shifting the shiftable wall to permit the article to be discharged freely and easily from the bucket in a straight line and in the same plane.

Still another object of the invention is the provision of a new and improved means of simple and economical construction whereby a completely or partially wrapped article may be shifted from a predetermined horizontal position to a predetermined vertical position while successive articles are being discharged, preferably in a straight line, from the conveying and transferring mechanism.

Numerous other objects and advantages will be apparent throughout the progress of the specification which follows.

The accompanying drawings illustrate a selected embodiment of the invention, and the views therein are as follows:

Fig. 1 is a detail elevational view of a part of a wrapping machine showing the improved conveying, transferring and discharging mechanism of the invention;

Fig. 2 is a detail vertical sectional view on the line 2—2 of Fig. 1;

Fig. 3 is a detail top plan view of a part of the machine, and disclosing certain of the conveying, transferring and discharging mechanism of the invention;

Fig. 4 is a detail side elevational view of the structure of Fig. 3;

Fig. 5 is a detail top plan view at the discharge end of the machine showing the manner in which the wrapped or partially wrapped articles are shifted from a horizontal to a vertical position; and Fig. 6 is a detail transverse sectional view on the line 6—6 of Fig. 5.

The particular construction herein shown for the purpose of illustrating the invention comprises a wrapping machine 1 embodying a frame 2 in which idler and driving sprockets 3 are mounted, only the driving sprockets 3 at the discharge end of the machine being shown. The driving sprockets 3 are adapted to be mounted on a driven shaft 4 and are for the purpose of driving a continuous conveyor 5 which trains over both the idler and driving sprockets.

The conveyor 5 comprises a plurality of spaced buckets 6 each of which is pivotally connected at its adjacent ends by means of sprocket chain links 7, Fig. 4. Each bucket 6 comprises a rigid base 8 having a rear upwardly extending rigid integral wall 9 and a front upwardly extending rigid wall 10. An intermediate shiftable wall 11 is arranged between the walls 9 and 10. The shiftable wall 11 comprises an upstanding rigid element 12 terminating in opposed downwardly extending legs 13 which straddle the rigid body part or base 8 of each bucket 6. The shiftable wall 11 is pivotally mounted at 14, to an extension 15 on the base 8 by means of a pin extending through aligned holes in the legs 13 and the extension part 15. Spring means 16 engage an extension 17 on the legs 13, and normally urge the shiftable member 11 in a normally vertical position, as clearly shown to the left of Figs. 1 and 4. Abutments or shoulders are provided on the shiftable wall and engage cooperating shoulders on a part of the bucket to limit the shiftable movement of the shiftable member 11. Each front wall 10 of a bucket 6 is provided with an outwardly extending flange part 18 which is adapted to extend over the upper edge of the rear wall 9 of a forward adjacent bucket and thereby to cooperate with a wrapper 19 of an article 20 in said forward adjacent bucket.

The wrappers 19 are adapted to be inserted within a bucket 6 by any suitable mechanism. The side edges of each wrapper 19 extend upwardly as shown in the extreme left-hand bucket of Fig. 1, and an article 20 is adapted to be arranged between the upstanding parts of the wrapper and within the buckets 6, as clearly shown at the left in Fig. 1. The movement of the continuous conveyor 5 causes the overhanging flange 18 of one bucket to engage a part of the upstanding wrapper of a forward adjacent bucket and bend that part of the wrapper slightly forwardly as indicated at 21, Fig. 1. Mechanism (not shown) is provided for folding over, and sealing the free extending ends of the wrappers 19, whereby the articles 20 will be encased within a wrapper. The conveyor 5 moves under spring pressed plates 22 which engage the upper side of the encased article and hold the previously folded edges together and permit the sealing material on the folded over free ends to become set while the encased article is being moved by the conveyor. Other mechanism (not shown) is provided to fold the wrapper at one end to form a closed end 23 as shown in Fig. 3. The other end of the wrapper 19 may be allowed to remain open and may be closed later in desired or convenient manner, such as by mechanism (not shown), or by hand if desired.

A cam bar (not shown) at the forward end of the machine and on each side thereof is adapted to engage a roller 24 on the forward ends of the extending arms 17 to shift the shiftable member 11 outwardly so as to permit a wrapper 19 and an article 20 to be received within the space defined by the rear wall 9 and the shiftable wall 11. The rollers 24 leave the cam bars after the conveyor has moved a predetermined distance, whereupon the spring 16 will return the shiftable member 11 back and into engaging or holding position and impinge the wrapper and the article between the walls 9 and 11. The wrapper is then folded about the article in any desired manner by any desired mechanism.

The conveyor 5 brings the buckets 6 and the wrapped or partially wrapped articles successively into position to be discharged in a straight line. Sprocket teeth 25 on each sprocket wheel 3 engage the connecting links 7 to drive the endless conveyor 5. The peripheral edges of the sprocket wheels between each tooth 25 are relatively flat, as indicated at 26, Fig. 4, to cooperate with the flat bottoms of the buckets 6.

The wrapped, or partially wrapped, articles are successively removed from their buckets 6 by means of spaced fingers 27 which move in an orbital path as indicated by the arrow formation shown in Fig. 4. The rollers 24 on the extensions 17 on the buckets 6 are adapted to engage a cam bar 28 which is rigidly fixed to opposite sides of the frame as the buckets approach the end of their travel. The engagement of the rollers 24 with the cam bar 28 shifts the shiftable wall 11 to the position indicated at 29, Fig. 4, whereupon the fingers 27 are adapted to engage opposite projecting ends of the article, and remove the articles in a straight line from the buckets as the buckets move about the outer periphery of the sprocket 3, Fig. 4. The fingers 27 engage the opposite ends of the articles in the buckets as each article extends or projects a predetermined distance beyond the outer side edges of the buckets 6, as clearly shown in Fig. 3. These fingers 27 move the wrapped, or partially wrapped, articles off of the conveyor onto a discharge receiving member 30, preferably in a straight line.

The opposed fingers 27 operate in an orbital path having movement in both vertical and horizontal directions, the fingers 27 being pivotally connected at 31 to an arm 32 of a bell crank 33 which is pivotally mounted on a shaft or pin 34, Figs. 1 and 4. The other arm 35 of the bell crank 33 carries a cam roller 36 which operates in a cam groove 37 of a cam 38 which is mounted on a shaft 39, Fig. 1. The operation of the bell crank 33, being controlled by the cam 38, causes up and down or vertical movement of the spaced fingers 27.

The fingers 27 are given back and forth movement by means of links 40, Figs. 1 and 4, which pivotally connect to the fingers 27. The links 40 are pivotally connected at 41 to the arm 42 of a bell crank 43. The bell crank 43 may be pivotally mounted on the shaft 34, or to another shaft, or on an extension of the shaft 34. The other arm 44 of the bell crank 43, Fig. 1, carries a cam roller 45, Fig. 1, which is adapted to operate in a camway in the same cam 38, or it may operate in a camway in another cam; the other cam may have its own camway and may be mounted on the same shaft 39 on which the cam 38 is mounted and driven. The bell crank 33, therefore, gives up and down movement to the fingers 27, while the bell crank 43 gives back and forth or longitudinal motion to the fingers 27. The fingers 27 are therefore caused to move upwardly and engage a package in a bucket after the shiftable wall 11 has been shifted to open position and then push the article forwardly out of the bucket in a straight line and onto the discharge platform or element 30. After the article has been moved out of the bucket, the fingers move to the left, Figs. 1 and 4, and then downwardly where they recede below the bottom edge of the buckets, and then move to the right to engage the left-hand edge of a next succeeding article to remove that article from its bucket. The movement of the fingers 27 is such that each successive article will be ejected or discharged in a straight line from its supporting bucket as each bucket approaches the end of the conveyor. The articles on the article receiving platform 30 are shifted along the platform 30 by the next succeeding article being ejected or discharged.

It is desirable and advantageous in packaging many articles such as, for instance, bottles, which are specifically shown herein, that they be wrapped while the bottles lie on their sides and then later set on end. Therefore, novel means are provided for causing the wrapped or partially wrapped articles, such as bottles, to be shifted from a horizontal side position to a vertical end position progressively, as shown diagrammatically in Fig. 1. The means for effecting the positioning of the wrapped bottles from horizontal position to vertical position is accomplished by means of mechanism indicated generally by the numeral 46, Figs. 1, 5 and 6.

The mechanism 46 comprises a plate, or other upstanding member, 47 which is secured rigidly to a part attached to, or extending from, the main frame 2 of the machine, Figs. 1 and 5. A guide rod or bar 48 is secured rigidly to the member 47 and extends a predetermined distance therebeyond. The rod or bar 48 inclines inwardly, the angle of the inclination being increased from the point 49 to the point 50 where it terminates in a straight part 51. The outer end of the bar or rod 48 may be secured to a supporting element 52 near the end of the part 51. The bar or rod 48 also slopes upwardly from its attachment to the member 47 to the point 50, as clearly shown in Fig. 1.

A pair of guide rods or bars 53 and 54 are spaced from the rod 48 and cooperate with the article on one side and bottom respectively, Fig. 6. The bars 53 and 54 are positioned in different horizontal and vertical planes but are each attached at the inner end to a part 55 on the machine main frame. The rod or bar 53 begins at a point above the other bar 54 and is of a length equal to or substantially equal to the rod or bar 48, Fig. 5.

The rod or bar 53 inclines downwardly, and terminates near its end into a straight part 56 which is parallel with the end 51 of the rod 48. The downward inclination of the rod 53 increases at the point 57, Fig. 5, terminating into a relatively straight part in a horizontal plane beyond the point indicated at 58, Fig. 5. The rod or bar 53 also inclines inwardly a predetermined distance, said distance being substantially one-half of the distance between the rod or bar 53 and the rod or bar 48.

The other rod or bar 54 inclines downwardly and terminates at its end in a straight part which is parallel to the parts 51 and 56 of the bars 48 and 53, respectively. The downward inclination of the rod or bar 54 is less than the inclination of the adjacent upper rod or bar 53. The lower bar 54 also inclines inwardly so that its termination point 59, Fig. 6, will be parallel with the ends 51 and 56 but slightly above the termination point 56 of the rod 53 and below the termination point 51 of the rod or bar 48. The lateral inclination of the bar 54 is such that it will finally terminate above the bottom of the package and at one side thereof, as clearly shown in Fig. 6.

The rods or bars 48, 53 and 54 are guide rods, and cause the package to be shifted progressively from horizontal to vertical position, as indicated diagrammatically in Fig. 1. The wrapped bottles, as they leave the discharge platform will rest horizontally on the lower bar 54 and the side bar 48. As a next succeeding package pushes a prior package along the path of discharge, the end 60, or neck part, of the package will lie on the upwardly inclining bar 48 and on top of the lower bar 54, these two bars being parallel at their receiving ends. The end 61, Fig. 6, of the package then will be engaged by the inside edge of the upper bar 53. The bar 48 inclines upwardly, while the upper bar 53 inclines downwardly; therefore, as the wrapped bottle is being urged progressively along the bars 48, 53 and 54, it is guided by the bars, whereupon the bottom of the package will be caused to move downwardly while the upper end of the package, that is the neck end 60, will be caused to be raised. Because of the lateral and vertical inclination of these guide rods 48, 53 and 54, the package will be progressively turned from horizontal position to vertical position. The positioning of the rods 48, 53 and 54 is such that the approximate center of gravity of the wrapped or partially wrapped article will be at the point indicated at 62, Fig. 6; and the guide rods are so inclined vertically and laterally to effect easy turning or pivotal movement of the wrapped bottles from flat to vertical position. The upper guide rod 53 is such that it will always maintain contact with the closed end 61 of the wrapped bottle and, therefore, permit the bottle to slide along said rod and at the same time maintain the bottom folds or flaps of the previously glued flaps in position. The rod 53, therefore, is always in engagement with the bottom of the wrapped bottle, and finally supports the packaged bottle in a vertical position, as shown in Fig. 6. The rod 54 also guides each wrapped bottle during its movement along the structure 46 terminating in a position whereby its end 59 will engage the side of the wrapped bottle a predetermined distance above the bottom thereof, see Fig. 6. The inclined rod 48 is such that it will engage the side of the wrapped bottle a predetermined distance above the center thereof, whereby the wrapped bottle will be maintained and supported in its upright position in the manner disclosed in Fig. 6. Succeeding wrapped bottles will push the vertically positioned bottles successively off of the mechanism 46 onto a conveyor or other support where they may be placed in boxes, cartons and the like.

The present invention discloses the bottles wrapped with the bottom closed, but with the top open, as indicated at 63, as it has been found desirable and advantageous in connection with the particular bottle involved herein that the end be creased, folded and sealed manually.

An additional member 64 may be arranged at the discharge end of the structure 46 to assist in guiding the stood-on-end bottles as they are being discharged, Fig. 5.

The invention provides conveying and transporting mechanism for moving bottles successively along a continuously operating conveyor, the bottles being partially wrapped during the conveying and transferring operations. The invention further provides unique means for shifting the position of the bottles from a normally horizontal to a vertical position. The mechanism for effecting the shifting or pivotal turning of the bottles is simple, positive and effective and extremely economical.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A wrapping machine for wrapping or partially wrapping articles in wrappers to form a package, comprising movable conveying and transferring mechanism including hingedly connected buckets movable along a predetermined path, each bucket including spaced walls and an intermediate shiftable wall to receive and support a package which is arranged between one of said spaced walls and the shiftable wall, yieldable means normally urging said shiftable wall to clamping position against the package, cam means positioned adjacent the bottom of a bucket and engageable with a part of said shiftable wall to move said shiftable wall to discharge the package from a bucket when a bucket arrives at a predetermined discharge position, and means engageable with a package and movable in the same direction as said conveying means to move the package from the bucket at a predetermined elevation when the shiftable wall has been moved.

2. A wrapping machine for wrapping or partially wrapping articles in wrappers to form a package, comprising movable conveying and transferring mechanism including hingedly connected buckets movable along a predetermined path, each bucket including spaced walls and an intermediate shiftable wall to receive and support a package which is arranged between one of said spaced walls and the shiftable wall, means to move said shiftable wall to discharge the package from a bucket when a bucket arrives at a predetermined discharge position, and means movable in an orbital path and engageable with a package to move the package out of a bucket in a straight line when the shiftable wall is shifted.

3. A wrapping machine for wrapping or partially wrapping articles in wrappers to form a package, comprising movable conveying and transferring mechanism including hingedly connected buckets movable along a predetermined path, each bucket including spaced walls and an intermediate shiftable wall to receive and support a package which is arranged between one of said spaced walls and the shiftable wall, means to move said shiftable wall to discharge the package from a bucket when a bucket arrives at a predetermined discharge position, means movable in an orbital path and engageable with a package to move the package out of a bucket in a straight line when the shiftable wall is shifted, a platform to receive said packages when moved out of said bucket, and means for shifting said packages from a predetermined position to a position angularly of said predetermined position.

4. A wrapping machine for encasing articles within wrappers to form packages and comprising conveying and transferring mechanism including a plurality of hingedly connected buckets movable along a straight line, a rigid wall and a shiftable wall carried by each bucket to support a package therebetween, means to operate the shiftable wall to permit a package to be discharged successively from successive buckets while said buckets are in motion, a receiving platform upon which said packages are successively received, and means movable in an orbital path and operating in timed relationship with the shifting of said shiftable wall to remove packages successively from said buckets as the buckets arrive in position with said platform.

5. A wrapping machine for encasing articles within wrappers to form packages and comprising conveying and transferring mechanism including a plurality of hingedly connected buckets movable along a straight line, a rigid wall and a shiftable wall carried by each bucket to support a package therebetween, means to operate the shiftable wall to permit a package to be discharged successively from successive buckets while said buckets are in motion, a receiving platform upon which said packages are successively received, means movable in an orbital path and operating in timed relationship with the shifting of said shiftable wall to remove packages successively from said buckets while they are in motion as the buckets arrive in position with said platform, and means for receiving and supporting said packages in contacting relationship, the packages being moved along said last named means by the packages being discharged.

6. A wrapping machine for encasing articles within wrappers to form packages and comprising conveying and transferring mechanism including a plurality of hingedly connected buckets movable along a straight line, a rigid wall and a shiftable wall carried by each bucket to support a package therebetween, cam means to operate the shiftable wall momentarily to permit a package to be discharged successively from successive buckets while said buckets are in motion, a receiving platform upon which said packages are successively received, means operating in the same direction as said conveying means and in timed relationship with the momentary shifting of said shiftable wall to remove packages successively from said buckets while they are in motion as the buckets arrive in position with said platform, and means for receiving and supporting said packages in contacting relationship, the packages being moved along said last named means by the packages being discharged, said last named means causing said packages to be shifted bodily from one position to another position.

7. Package conveying and transferring mechanism comprising a plurality of hingedly connected buckets to form a continuous movable package receiving conveyor, said buckets each comprising a front wall, a rear wall and an intermediate normally closed shiftable wall, yieldable means normally maintaining said shiftable wall closed, whereby articles are clamped and supported between the shiftable wall and one of said other walls, cam means to momentarily shift said shiftable wall of said buckets to open position successively as said buckets arrive at a predetermined position, means to discharge a package from a bucket in the same direction as the movement of the conveyor while the shiftable wall is momentarily shifted, and package supporting means upon which the discharged packages are received, said packages being shifted along the supporting means by subsequent packages being discharged.

8. Package conveying and transferring mechanism comprising a plurality of hingedly connected buckets to form a continuous movable package receiving conveyor, said buckets each comprising a front wall, a rear wall and an intermediate normally closed shiftable wall, yieldable means normally maintaining said shiftable wall closed, whereby articles are clamped and supported between the shiftable wall and one of said other walls, cam means to momentarily shift said shiftable wall of said buckets to open position successively as said buckets arrive at a predetermined position, means to discharge a package from a bucket in the same direction as the movement of the conveyor while the shiftable wall is momentarily shifted, package supporting means upon which the discharged packages are received, said packages being shifted along the supporting means by subsequent packages being discharged, and means to shift said packages bodily progressively while being moved along said package supporting means.

9. Package conveying and transferring mechanism comprising a plurality of hingedly connected buckets to form a continuous movable package receiving conveyor, said buckets each comprising a front wall, a rear wall and an intermediate normally closed shiftable wall, yieldable means normally maintaining said shiftable wall closed, whereby articles are clamped and supported between the shiftable wall and one of said other walls, cam means to momentarily shift said shiftable wall of said buckets to open position successively as said buckets arrive at a predetermined position, means to discharge a package from a bucket in the same direction as the movement of the conveyor while the shiftable wall is momentarily shifted, package supporting means upon which the discharged packages are received, said packages being shifted along the supporting means by subsequent packages being discharged, and means to shift said packages bodily progressively while being moved along said package supporting means, said last named means comprising guide rods inclining vertically and laterally and spaced in different horizontal planes.

10. Package conveying and transferring mechanism comprising a plurality of hingedly connected buckets to form a continuous movable package receiving conveyor, said buckets each comprising a front wall, a rear wall and an intermediate normally closed shiftable wall, whereby articles are clamped and supported between the shiftable wall and one of said other walls, cam means to shift said shiftable wall of said buckets momentarily and successively as said buckets arrive at a predetermined position, a projecting flange on the front wall and adapted to overhang the rear wall on a forwardly positioned bucket, and means to discharge a package from a bucket while the shiftable wall is momentarily shifted.

CLARENCE J. MALHIOT.

References Cited in the file of this patent

UNITED STATES PATENTS

| Number | Name | Date |
|---|---|---|
| 1,273,947 | Stevenson | July 30, 1918 |
| 1,290,888 | Bracy | Jan. 14, 1919 |
| 1,446,161 | Cushman et al. | Feb. 20, 1923 |
| 1,508,708 | McBride | Sept. 16, 1924 |
| 2,323,350 | Paynter | July 6, 1943 |
| 2,407,313 | Malhiot | Sept. 10, 1946 |
| 2,430,878 | Kimball | Nov. 18, 1947 |